United States Patent [19]

Strong

[11] 4,022,561
[45] May 10, 1977

[54] MACHINE FOR MANUFACTURING PLASTICS BOTTLES AND OTHER HOLLOW ARTICLES

[76] Inventor: Bernard Strong, 22228 Victory Blvd. Apt. H 211, Woodland Hills, Calif. 91364

[22] Filed: June 7, 1976

[21] Appl. No.: 694,068

[52] U.S. Cl. .................. 425/326 B; 425/DIG. 206
[51] Int. Cl.² ........................................ B29C 17/07
[58] Field of Search ... 425/326 B, 387 B, DIG. 206, 425/DIG. 212, DIG. 213, DIG. 215

[56] References Cited
UNITED STATES PATENTS 3,837,780  9/1974  Strong ............................... 425/326

*Primary Examiner*—Richard B. Lazarus
*Attorney, Agent, or Firm*—Brisebois & Kruger

[57] ABSTRACT

A blow-molding machine comprises a plastics extruder having a horizontal barrel which is mounted to swing in a horizontal plane about a vertical axis at or close to the center line of the extruder hopper, whereby the downwardly directed extrusion nozzle at the end of the barrel may be smoothly swung between an extruding station and a molding station horizontally spaced from the extruding station. A vertical blow pin, mounted to be moved horizontally between the molding station and a discharging station, moves the extrusion nozzle therewith so that when the blow pin is moved from the molding station to the discharging station, the continuously extruding parison is transported between the halves of a split blow mold at the molding station. Means are provided for severing the parison from the parent plastics material, whereafter the extrusion nozzle is restored to the extruding station and the blow pin is moved to the molding station and inserted into the parison to compression mold the neck portion of the article and effect the blow molding of the article. When the blown article has cooled sufficiently, the mold-halves are opened, the article is transported on the blow pin to the discharging station where it is deposited in an upright position on a take-off platform, subsequent closure of the mold halves closing trimming plates to trim excess plastics material from the hollow article. In a modified embodiment, the production rate is increased by providing the machine with two molding stations at opposite sides of the extruding station.

10 Claims, 5 Drawing Figures

MACHINE FOR MANUFACTURING PLASTICS BOTTLES AND OTHER HOLLOW ARTICLES

BACKGROUND OF THE INVENTION

This invention relates to machines for manufacturing all types of blown hollow articles made of thermoplastic materials and particularly those having a neck opening.

Blow-molding machines are known in which an extruded parison is enclosed in a mold cavity and, after serving the parison from the plastics material in the extrusion nozzle, the mold is moved relative to the nozzle to enable a blow pin to be inserted in the open end of the parison, blowing air then being admitted through the blow pin to expand the parison to the configuration of the cavity to mold a hollow article. If the molds are moved bodily from the extrusion nozzle to the blow pin, vibration problems arise, particularly if the molds are very heavy, and to reduce vibration machines have been designed in which the extruder and blow pin are moved while the molds remain at the same station. One such machine is described in U.S. Pat. No. 3,837,780 issued Sept. 24, 1974 to Paul Strong.

An object of the invention is to provide an improved machine which practically eliminates objectionable vibration.

A further object is to provide a machine which provides for trimming excess plastics materials from the blown hollow articles within the platens, for continuous extrusion, and for oriented removal of the articles.

SUMMARY OF THE INVENTION

In the machine according to the invention the extruder barrel is disposed horizontally and mounted for pivotal movement in a horizontal plane about a vertical axis at or close to the center line of the extruder hopper, whereby the extrusion nozzle at the end of the extruder barrel may be smoothly swung between an extruding station and at least one molding station horizontally spaced from the extruding station. A blow pin, mounted to be moved by a cylinder horizontally between the molding station and a discharging station horizontally spaced from the molding station in the direction away from the extruding station, is coupled to the extrusion nozzle so that when the blow pin is moved from the molding station to the discharging station the extrusion nozzle is moved from the extruding station to the molding station. The continuously extruding parison is thus smoothly transported between the halves of a split blow mold at the molding station, and after the mold-halves have been closed therearound the parison is severed from the plastic material in the extrusion nozzle which is immediately returned to the extruding station, and the blow pin is moved to the molding station and inserted in the open end of the parison to compression mold the neck of the article and effect the blow molding of the article. After the hollow article has sufficiently cooled, the mold is opened and the hollow article is transferred on the blow pin to the discharging station while simultaneously the parison depending from the extrusion nozzle is moved between the mold-halves at the molding station. The blown article is held on a take-off platform while the blow pin is retracted whereafter the moldhalves close and simultaneously trimming plates carried by the platens close together at the discharging station to sever excess plastic material from the top and bottom of the article which has just been deposited in an upright position on the take-off platform at the discharging station. The cycle then repeats.

DESCRIPTION OF PREFERRED EMBODIMENTS

Figure 1:
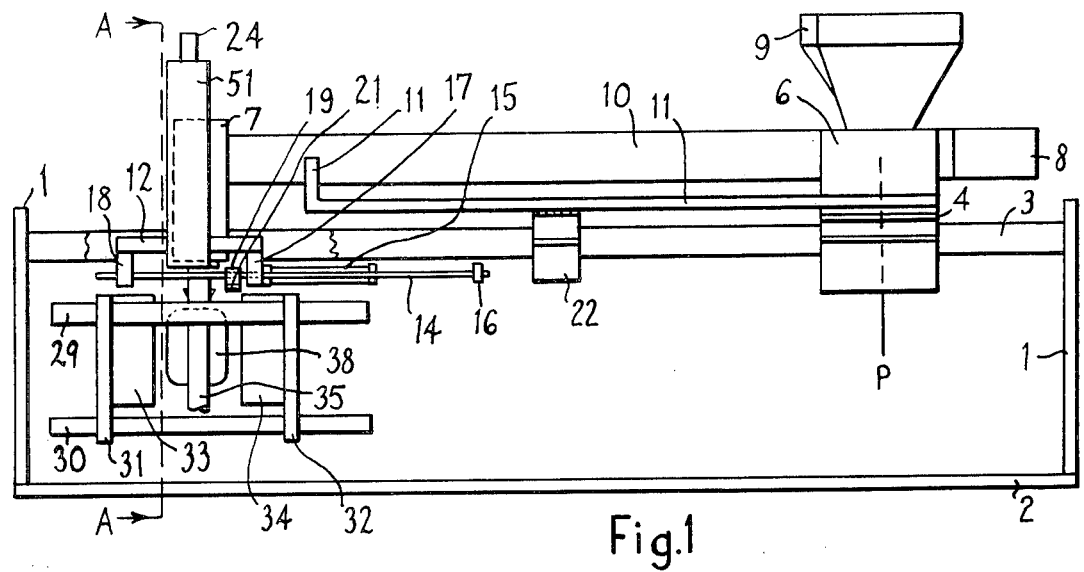
FIG. 1 is a side view of one embodiment of a machine according to the invention having a single molding station.
Figure 2:
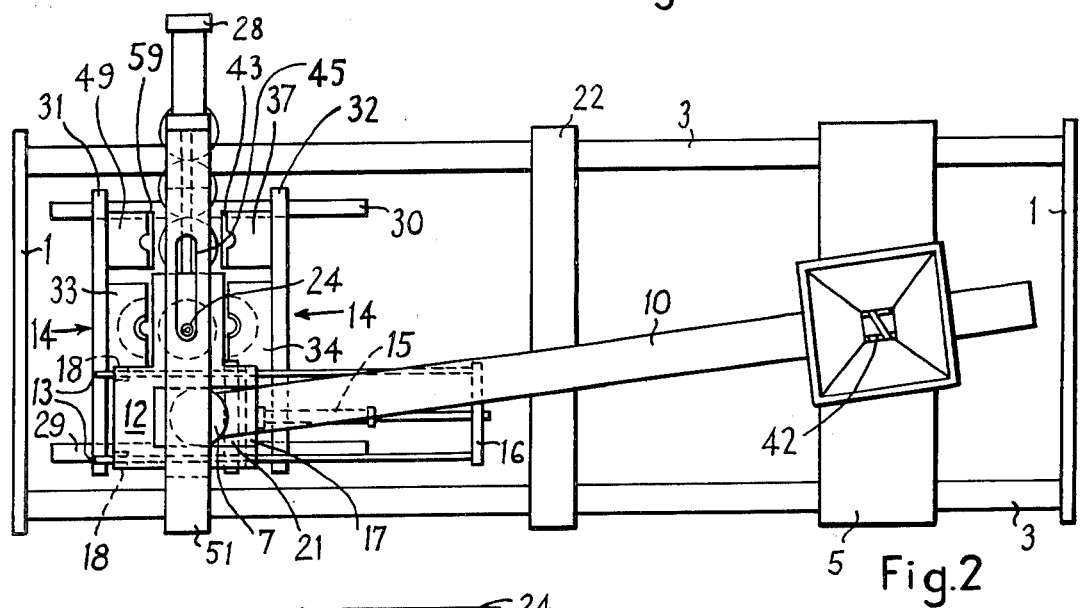
FIG. 2 is a plan view of FIG. 1.
Figure 3:
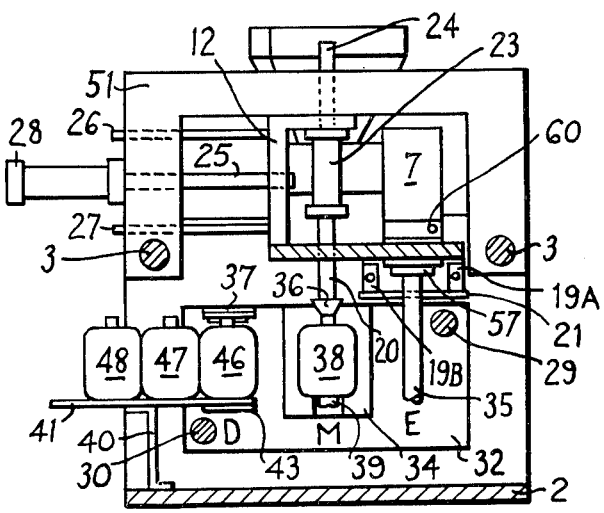
FIG. 3 is a section along the line A—A of FIG. 1.

Referring to FIGS. 1–3 of the drawings, the machine comprises front and rear supports 1,1 mounted on a base plate 2 and connected together at their upper ends by tie bars 3,3, thus forming a framework for supporting an extruder for pivotal movement about a vertical axis indicated by P. The extruder comprises a barrel 10 which extends horizontally above the framework and is provided at its rear end with a hydraulic motor 8 for driving the extruder screw 42 and at its forward end with an extrusion crosshead 7 provided at its lower end with a downwardly directed extrusion nozzle 57 within which is arranged a core (having an air passage therethrough) whereby plastics material extrudes through the nozzle in the form of a downwardly depending tubular parison. The barrel 10 is provided adjacent its rear end with a hopper feed block 6 which rests through a thrust race 4 on a support 5 secured across the tie bars 3,3 for pivotal movement about the vertical axis P. The hopper feed block 6 supports a hopper 9 for granular plastics material. The extruder barrel 10 is further supported by a support arm 11 extending forwardly from the hopper feed block 6 and transversely slideable on a support bar 22 extending between the tie bars 3,3 and located at an intermediate position along the length of the barrel.

Cooperating with the front end of the extruder barrel is a guide bracket 12 which is mounted for transverse sliding movement on guide bars 26, 27 slideable in apertures in an inverted U-shaped thrust bracket 51 carried from the tie bars 3,3. Movement of the guide bracket 12 is effected by a hydraulic cylinder 28 carried by the thrust bracket 51. The guide bracket 12 is provided with a U-shaped cut-out which embraces the extrusion crosshead 7 so that transverse movement of the guide bracket 12 causes the nozzle of the extrusion crosshead to move from the extruding station indicated at E to a molding station indicated at M.

Also carried by the guide bracket is downwardly directed blow pin 20 which can be raised or lowered by means of a hydraulic cylinder 23. The upper end 24 of the blow pin 20 projects above and slides in a transverse slot 45 in the thrust bracket 51. The axis of the blow pin 20 is horizontally spaced from the axis of the extrusion nozzle 57 by the same distance as that between the extruding and molding stations, and the movement imparted to the guide bracket 12 by the cylinder 28 is such that the axis of the extrusion nozzle 57 is moved from the extruding station to the molding station by operation of the cylinder 28 in one direction and vice versa by operation of the cylinder 28 in the opposite direction. When the extrusion nozzle 57 is moved from the extruding station E to the molding station M the blow pin 20 is simultaneously moved from the molding station M to a discharging station indicated at D.

Supported beneath the guide bracket 12 is a knife assembly comprising a knife blade 21 carried by blade mounts 19, secured to two parallel rods 13,13 slideable through apertures in an end plate 17 and brackets 18 depending from the underside of the guide bracket 12. The knife blade 21 is moved by means of a hydraulic cylinder 15 carried from the end plate 17 and having its piston rod connected to a cross member 16 interconnecting the rods 13,13. The knife blade 21 is arranged to slide back and forth directly beneath the extruder nozzle 57 to sever and extruder parison from the plastics material in the nozzle.

Supported by guide bars 29,30 are a pair of platens 31,32 for supporting the halves 33,34 of a split blow-mold having a single cavity in which the blown hollow article is to be formed. The guide bars 29,30 are supported from the base 2 by suitable brackets (not shown) and are moved by means, such as hydraulic cylinders or toggles, as is well known in the art and is diagrammatically represented by the arrows 14. The platens 31, 32 extend transversely for a distance which embraces the extruding, blowing and discharging stations and carry at their central regions the mold halves 33, 34 so as to be closed around a parison 35 when transferred to the molding station. Also carried by the platens are upper and lower pairs of trimming members 37, 49 and 43, 59 which cooperate with a blown article when transferred to the discharging station D, as will be hereinafter explained, to trim off excess plastics material at its upper and lower ends. Also at the discharging station is located the end of a take-off plate 41 which is supported from the base 2 by a bracket 40 and on which blown hollow articles are discharged as will be later explained and along which the finished hollow articles are moved to take them from the machine.

The sequence of operation for forming hollow articles with the machine described with reference to FIGS. 1 to 3 is as follows:

With the extruder crosshead 7 in the extruding station E, a tubular parison 35 is extruded from the extrusion nozzle 57. During the time that the parison 35 is being extruded, a hollow article 38 formed during the previous cycle is being cooled and shaped to the configuration of the cavity in the mold halves 33, 34 which are then in the closed position at the molding station M. The blow pin 20, which is then at the molding station and has been lowered to extend into the neck end of the hollow article 38, has blowing air supplied therethrough to shape the hollow article. A timing means is provided so that when the hollow article 38 has been sufficiently cooled, blowing air through the blow pin 20 is exhausted and the mold halves are caused to open by the platen operating means 14. The rate of extrusion through the nozzle 57 is regulated in relation to the timing means so that the parison 35 attains the desired length during the cooling time required by the hollow article 38 formed during the previous cycle.

Immediately the mold halves 33, 34 are fully opened, a timing means or sequence switch arrangement operates the shift cylinder 28 so that the guide bracket 12 moves to the left (FIG. 3) taking with it the previously formed hollow article 38 suspended from the blow pin 20. In so moving to the left, the hollow article 38 pushes to the left the previously formed hollow articles 46, 47, 48 on the take-off plate 41 and hollow article 38 will then be at the discharging station D and standing on the right-hand end of the take-off plate 41.

Guide bracket 12, in moving to the left, siumultaneously moves the extruder barrel 10 together with the extrusion crosshead 7 and the depending parison 35 into the mid-zone of the mold halves 33, 34 at the molding station and in line with the mold-halves, which then close around the extruded parison in response to the operation of a sequence switch. During the time that the mold-halves are closing, air pressure is applied to the blow pin actuating cylinder 23 so as to cause the blow pin to move to its raised position which effectively strips the hollow article 38 from the blow pin 20, the article being restrained from rising up with the blow pin due to the pinch-off tab 39 projecting from its bottom being trapped by the configuration of the right-hand end of the take-off plate 41 which has a tapered entry slot into which the tab 39 rides. As mold-halves 33, 34 continue their closing action, the upper pair of trimming plates 37, 49 are closed to trim off the top of the neck of the hollow article by severing the pre-blown section 36 from the neck itself, which has already been compression molded around the blow pin 20. Simultaneously, the lower pair of trimming plates 43, 59 are also closed to shear off the tab 39. Collection shutes (not shown) may be provided for clearing both the preblown section 36 and tab 39 to convey them to a suitable granulator so that the material may be re-used by suitable mixing with virgin material.

Immediately the mold-halves 33, 34 are closed completely, a small amount of compressed air is admitted through the air orifice 60 which leads via the air passage in the core of the nozzle 57 to the inside of parison 35 so as to slightly expand the upper end of the parison so that it becomes slightly bulbous as shown at 36. The knife actuating cylinder 15 then operates to cause the knife blade 21 to move and sever from the parent body of material in the nozzle the extruded parison 35 which is then trapped between the mold-halves 33, 34 with the upper end of the parison slightly bulbous and cleanly cut with an open end just above the upper surfaces of the mold-halves. Immediately the knife blade 21 has completed the cutting operation, a sequence switch causes shift cylinder 28 to move guide bracket 12 to its extreme right position (FIG. 3) with a smooth transitional movement. When the guide bracket 12 reaches its extreme right position, fluid pressure is reapplied to the cylinder 23 to cause the blow pin 20 to descend rapidly into the open upper end of the parison 35, thus forming the upper neck section of the hollow article by compression molding. Air pressure is then immediately applied to the air connection 24 to admit blowing air through the blow pin 20 to expand the parison 35 to the shape of the cavity defined by the mold halves 33, 34. The upward thrust of the cylinder 23 on the guide bracket 12 is absorbed by the overhead thrust bracket 51. Immediately the hollow article within the mold-halves 33, 34 has been sufficiently cooled, application of blowing air to the blow pin 20 is stopped, the mold-halves are caused to open, and the cycle of operations is repeated.

Figure 4:
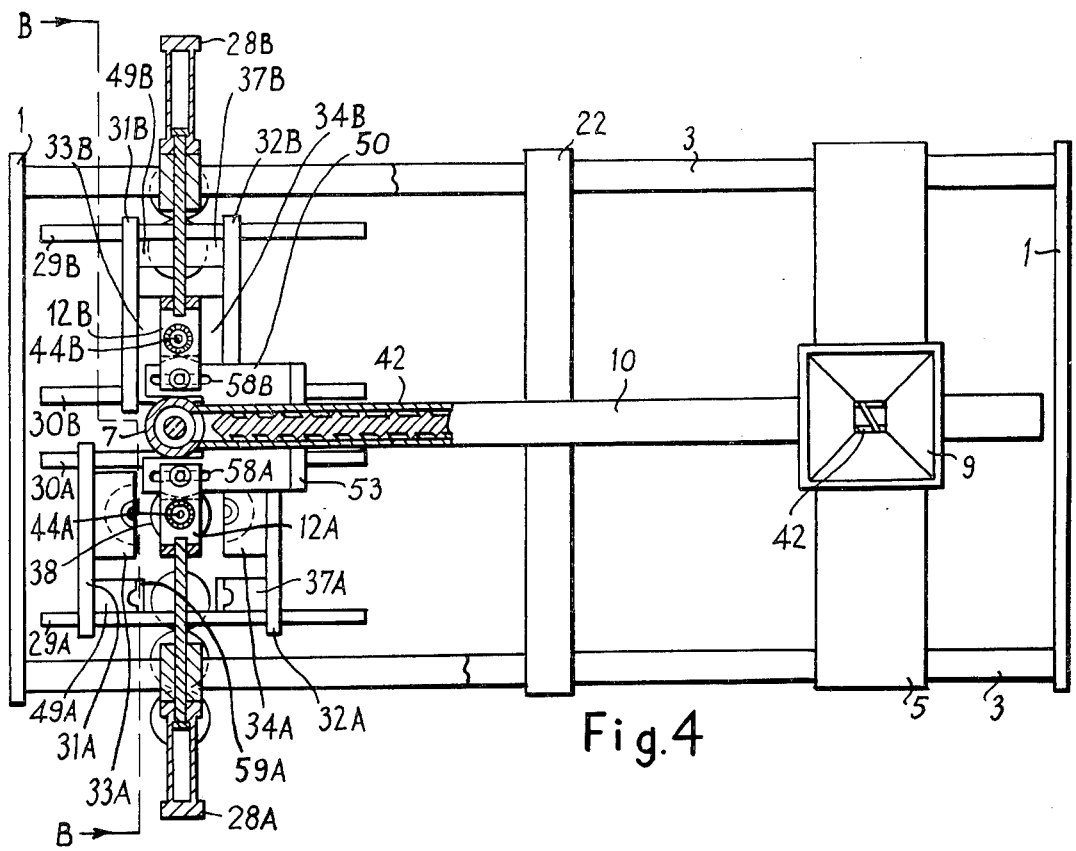
FIG. 4 is a plan view with the left end sectioned along the line C—C in FIG. 5 of a second embodiment of machine according to the invention having two molding stations.
Figure 5:
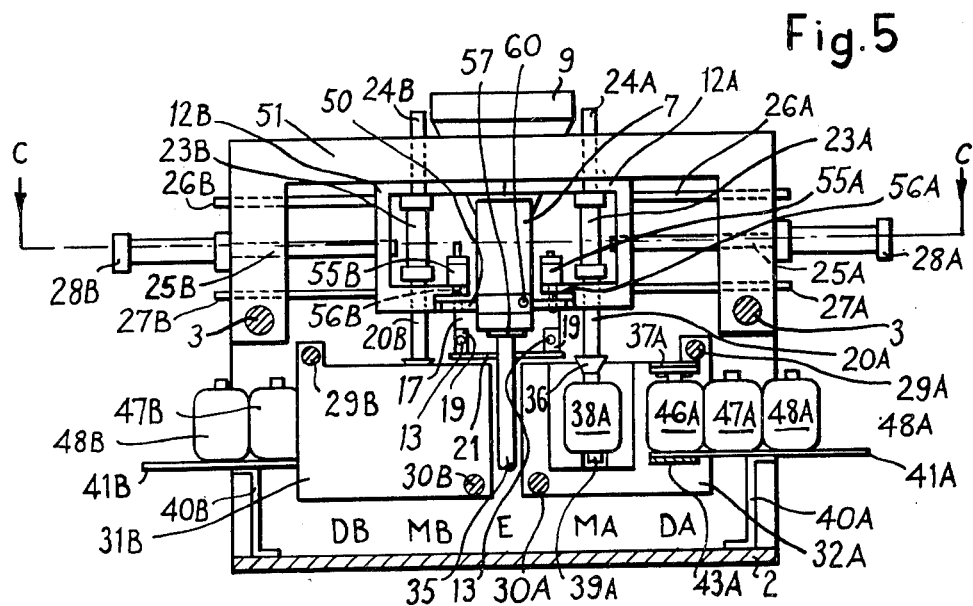
FIG. 5 is a section along the line B—B of FIG. 4.

FIGS. 4 and 5 show a modification of the machine according to FIGS. 1 to 3 in the provision of two molding stations disposed at opposite sides of the extruding station, each with its own individual mold operating means, a suitable dwell period being provided during the time when both molds are closed and cooling at the same time as extrusion is continuing. Like parts in this embodiment are indicated by the same reference numerals of the embodiment of FIGS. 1 to 3, the parts which are duplicated both to the right and left (as shown in FIG. 5) of the extruding station being identified by the suffixes A and B respectively.

As in the previous embodiment, the machine comprises end plates 1,1 carried from a base 2 and interconnected by tie bars 3,3 which carry the support members 5 and 22 for supporting the extruder barrel 10 for pivotal movement about a vertical axis alinged with the hopper 9. In this embodiment, the extruding station is located centrally between two pairs of platens 31A, 32A and 31B, 32B which carry the mold-halves 33A, 34A and 33B, 34B respectively at the two molding stations MA, MB. There are two discharging stations DA, DB at opposite sides of the machine, the spacings between the extruding station and the two molding stations, and between the respective pairs of molding and discharging stations, being equal.

Two guide brackets 12A, 12B each carrying respective blow pin actuating cylinders 23A, 23B and blow pins 20A, 20B are independently transversely slideable by respective shift cylinders 28A, 28B. Each guide bracket carries a respective locking cylinder 55A, 55B which operate respective locking pins 56A, 56B for interlocking the guide brackets 12A, 12B respectively to a guide plate 50 supported by a bracket 53, which may form the end of the support arm 11, coupled to the extruder barrel 10. The guide plate 50 has a U-shaped cut out receive the extrusion crosshead 7 and also carries therebeneath the cutting knife 21 and associated parts of the knife assembly. The locking pins 56A, 56B are engageable in two slots 58A, 58B provided in the guide plate 50.

The method of operating the machine according to FIGS. 4 and 5 is as follows.

The extruded parison 35 issues from a single extrusion die 57 as in the previous embodiment. During the extrusion time the two previously formed hollow articles (only one is shown at 38A) are maintained under cooling conditions within the respective cavities of the two sets of mold-halves 33A, 34A and 33B, 34B whereby production rates can be increased compared with the machine of the previous embodiment having a single moldng station. A timing means is provided so that when the hollow article 38A within the mold-halves 33A, 34A is sufficiently cooled, the blowing air admitted through the blow pins 20A is exhausted and the said mold-halves are opened. The rate of extrusion is regulated in relation to the timing means so that a parison attains the desired length at the same times as the respective hollow article has been sufficiently cooled. Immediately the mold-halves 33A, 34A have fully opened, a timing means or sequence switch arrangement operates locking cylinder 55A thus causing the locking pin 56A to descend into the right-hand slot 58A in the guide plate 50 to connect the latter to the guide bracket 12A. The right shift cylinder 28A is then operated and the guide bracket 12A is moved to the right, taking with it the previously formed hollow article 38A suspended from the right blow pin 20A and at the same time pulling with it the extrusion head 7 by pivotting the extruder barrel 10 around its vertical pivot. In moving to the right, hollow article 38A pushes the hollow article 46A formed in the previous cycle to the right and assumes the position on the discharge platform 41A previously occupied by the previously formed hollow article 46A. Also the parison 35 is moved into the blowing position MA in line with the mold-halves 33A, 34A which are then closed around the parison. During the time that the mold-halves are closing, fluid pressure is applied to the blow pin actuating cylinder 23A so as to cause it to raise blow pin 20A which effectively strips the hollow article from the blow pin, the hollow article being restrained from rising with the blow pin due to the pinch-off tab 39A thereon being trapped in the short tapered slot at the left hand end of the take-off plate 41A as described with the previous embodiment. As the mold-halves 33A, 34A continue their closing action the upper and lower pairs of trim plates 37A, 49A and 43A, 59A are closed, thus trimming off the top of the neck of the hollow article by severing the pre-blown section 36A from the neck itself which has already been compression molded around the blow pin 20A, and also trimming the tab 39A from the bottom of the hollow article.

Immediately the mold halves 33A, 34A are completely closed a small amount of compressed air is admitted through air orifice 60 so as to slightly expand the upper end of the parison which then becomes slightly bulbous as previously described. The knife blade 21 is then caused to operate to sever the parison 35 from the parent body of plastics material in the extrusion nozzle.

Immediately the knife blade 21 has completed the cutting, shift cylinder 28A operates to move the guide bracket 12A and guide plate 50 to the left so that the blow pin 20A is alinged with the parison in the mold-halves 33A, 34A and the extrusion nozzle 57 is restored to the extrusion station. When the guide bracket 12A reaches the molding station MA, blow pin actuating cylinder 23A is operated to cause the blow pin 20A to descend rapidly into the open upper end of parison 35 thus compression molding the neck portion of the next hollow article being produced in the right-hand moldng station MA. Air pressure is then applied to the connection 24A to blow pin 20A, thus expanding the parison to the shape of the mold cavity. The upward thrust of the cylinder 23A is absorbed by the overhead thrust bracket 51 as previously.

At this stage of the cycle the extrusion crosshead 7 will have been restored to the center position and the locking cylinder 55A is caused to withdraw its locking pin 56A from the right-hand slot 58A of the guide plate 50. During the movement of the extrusion crosshead 7 to the right and back to its center position, the other pair of mold-halves 33B, 34B have been closed around the previously extruded parison and have been expanded by blowing air admitted through the blow pin 20B. As soon as the hollow article which has been cooling within the cavity of the mold halves 33B, 34B has sufficiently cooled, blowing air to the blow pin 20B is exhausted, the moldhalves are caused to open, the locking pin 56B is engaged with the slot 58B in the guide plate 50, and the shift cylinder 28B is operated to move the guide bracket 12B and the guide plate and extrusion nozzle interlocked therewith towards the left, and the cycle of operations repeats with the left-hand section of the machine as previously occurred with the right-hand section of the machine.

I claim:

1. Machine for making blown hollow articles of plastics material comprising
 a. a frame structure, b. an extruder having a substantially horizontal extruder barrel having a downwardly extending extrusion nozzle adjacent one end thereof and means for the supply of plastics material to said barrel adjacent the other end thereof, c. means mounting and supporting said barrel on said frame structure for pivotal movement in a substantially horizontal plane about a vertical axis adjacent said other end of the barrel for movement of said nozzle between an extruding station and a molding station horizontally spaced from one another, d. said extrusion nozzle having a core defining therewith an annular extrusion orifice for extruding a tubular parison therethrough, e. opposing and spaced-apart platens to which halves of a split blow mold are adapted to be secured respectively, said mold-halves when closed together defining a cavity at said molding station in which a parison is to be blown to form a hollow article, f. means for moving said platens to close together or move apart mold halves supported thereby, g. means defining a passage in said core of the extrusion nozzle for admitting compressed air therethrough to a parison depending from the nozzle, h. cutting means for severing a parison, when the nozzle is in said molding station, from the plastics material within said nozzle, i. a downwardly directed blow pin mounted from the frame structure on a guide member movable horizontally to move the blow pin between said molding station and a discharging station horizontally spaced from said molding station in the direction away from said extruding station, j. means coupling said guide member and said extruder barrel for simultaneous movement of the extrusion nozzle between the extruding and molding stations and the blowing nozzle between the molding and discharging stations respectively, k. means for moving said guide member to move said blowing nozzle back and forth between said molding and discharging stations, and l. means for moving said blow pin vertically relative to said guide member between a lowered position and a raised position.

2. A machine according to claim 1, further comprising m. a platform for blown hollow articles which is below the blow pin when the latter is in the discharging station, and n. trimming means operable by movement of said platens for trimming off excess plastics material from a blown hollow article on said platform.

3. A machine according to claim 1, wherein the extruder barrel is mounted for pivotal movement about said vertical axis in one direction from said extruding station to said molding station and in the opposite direction from said extruding station to a second molding station horizontally spaced from said extruding station at the side of the extruding station opposite to the first molding station, said machine further comprising o. second opposed and spaced-apart platens at said second molding station to which halves of a second split blow mold are adapted to be secured respectively, said second mold-halves when closed together defining a cavity at said second molding station in which a parison is to be blown to form a hollow article, p. means for moving said second platens to close together or move apart mold-halves supported thereby, q. a second downwardly directed blow pin mounted from the frame structure on a second guide member movable horizontally to move said second blow pin between said second molding station and a second discharging station horizontally spaced from said second molding station in the direction away from said extruding station, r. means for moving said second blow pin vertically relative to said second guide member between a lowered position and a raised position, s. means for moving said second guide means to move said second blow pin back and forth between said second molding station and said second discharging station, and t. means for selectively coupling either the first or second guide member to said extruder barrel for simultaneous movement, said coupling being effective to move the extrusion nozzle from the extruding station to the first or second molding station when the first or second blow pin is respectively moved from its associated molding station to its associated discharging station.

4. A machine according to claim 3, further comprising m. a first platform for blown hollow articles which is below the first blow pin when the latter is in the first discharging station, n. first trimming means operable by movement of said first platens for trimming off excess plastics material from a blown hollow article on said first platform, u. a second platform for blown hollow articles which is below the second blow pin when the latter is in the second discharging station, and v. second trimming means operable by movement of said platens for trimming off excess plastics material from a blown hollow article on said second platform.

5. A machine according to claim 1, wherein said means for the supply of plastics material to said barrel comprises a hopper, and the vertical axis about which said extruder barrel pivots is substantially at the center line of said hopper.

6. A machine according to claim 1, and including means establishing a cycle of operation including in the following order the steps of:

i. extruding plastics material through said extrusion nozzle at said extruding station, ii. moving said platens apart, iii. moving the extrusion nozzle from said extruding station to the molding station and simultaneously moving the blow pin from the molding station to the discharging station, iv. moving the platens towards each other and simultaneously moving the blow pin upwardly, v. admitting compressed air through the passage in said core while said nozzle is at the molding station and then stopping the admission of blowing air therethrough, vi. operating said cutting means to sever the extruded parison from the plastic material in the nozzle while at said molding station, vii. moving said nozzle back to the extruding station and simultaneously moving the blow pin to the molding station, viii. lowering the blow pin, ix. admitting compressed air through said blow pin while in its lowered position and then stopping the admission of blowing air therethrough, and x. repeating the cycle of operation.

7. A machine according to claim 1, and including a first fluid pressure cylinder for moving said guide member, a second fluid pressure cylinder mounted on said guide member for raising and lowering said blow pin and an overhead thrust bracket carried from the frame structure and extending above said guide member and against which said guide member slides whereby said thrust bracket absorbs any upward thrust of said second cylinder.

8. A machine according to claim 1, including a transverse support member carried from the frame structure and extending transversely below the extruder barrel at a location intermediate its vertical pivot axis and the extrusion crosshead, and means slidingly supporting the extruder barrel on said transverse support member.

9. A machine according to claim 2, including means defining a tapered entry slot in the end of said take-off platform to receive the pinch-off tab at the bottom of a hollow article.

10. A machine according to claim 4, and including a first fluid pressure cylinder for moving said first guide member, a second fluid pressure cylinder mounted on said guide member for raising and lowering said first blow pin, a third fluid pressure cylinder for moving said second guide member, a fourth fluid pressure cylinder mounted on said second guide member for raising and lowering said second blow pin, an overhead thrust bracket carried from the frame structure and extending above said guide members and against which said guide members slide whereby said thrust bracket absorbs any upward thrust of said second and fourth cylinders, a transverse support member carried from the frame structure and extending transversely below the extruder barrel at a location intermediate its vertical pivot axis and the extrusion crosshead, means slidingly supporting the extruder barrel on said transverse support member, means defining a tapered entry slot in the end of each said take-off platforms respectively to receive the pinch-off tab at the bottom of a hollow article, fifth and sixth fluid pressure cylinders carried respectively by said respective guide members and operable to actuate respective locking pins adapted respectively to engage in openings in a guide plate secured to and movable with the extruder barrel, and a seventh fluid pressure cylinder for actuating said cutting means.

* * * * *